US010605547B2

(12) United States Patent
Bireaud et al.

(10) Patent No.: US 10,605,547 B2
(45) Date of Patent: Mar. 31, 2020

(54) HEAT EXCHANGER COMPRISING A PROTECTIVE DEVICE

(71) Applicant: Valeo Systemes Thermiques, Le Mesnil Saint-Denis (FR)

(72) Inventors: Fabien Bireaud, Le Mesnil Saint Denis (FR); Xavier Marchadier, Le Mesnil Saint Denis (FR); José Trindade, Le Mesnil Saint Denis (FR); Dinh-Luyen Nguyen, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/571,899

(22) PCT Filed: May 4, 2016

(86) PCT No.: PCT/EP2016/060088
§ 371 (c)(1),
(2) Date: Nov. 6, 2017

(87) PCT Pub. No.: WO2016/177831
PCT Pub. Date: Nov. 10, 2016

(65) Prior Publication Data
US 2018/0120040 A1    May 3, 2018

(30) Foreign Application Priority Data

May 6, 2015    (FR) ...................................... 15 54049

(51) Int. Cl.
*F28F 19/00*    (2006.01)
*F24D 19/06*    (2006.01)
(Continued)

(52) U.S. Cl.
CPC ............ *F28F 19/002* (2013.01); *B60R 19/52* (2013.01); *F24D 19/06* (2013.01); *F24D 19/065* (2013.01);
(Continued)

(58) Field of Classification Search
CPC ...... F24D 16/067; F24D 19/06; F24D 19/065; F24D 19/067; F24D 16/06; F24D 16/065;
(Continued)

(56) References Cited

U.S. PATENT DOCUMENTS 1,254,785 A  *  1/1918  Farrell ...................... F01P 7/10
                                                    165/98
2,236,986 A  *  4/1941  Beeman .................... F01P 7/10
                                                    160/11
(Continued)

FOREIGN PATENT DOCUMENTS

DE            1909848 A1  *  9/1970   ............. F24D 19/06
DE          29801129 U1  *  3/1998   ............. F24D 19/06
(Continued)

OTHER PUBLICATIONS

JP 2011162092 A English Machine Translation—Retrieved May 2018.*
(Continued)

*Primary Examiner* — Cassey D Bauer
*Assistant Examiner* — Jenna M Hopkins
(74) *Attorney, Agent, or Firm* — Osha Liang LLP

(57) ABSTRACT

A heat exchanger is disclosed. The heat exchanger includes a protective device, mutually parallel tubes through which a first fluid circulates, and perpendicular fins connecting two successive flat tubes, a second fluid circulating between said flat tubes by passing through said fins, the protective device being apertured so as to allow the circulation of the second
(Continued)

fluid through the fins. The protective device includes fixing spikes which are inserted forcibly between the fins.

5 Claims, 2 Drawing Sheets

(51) Int. Cl.
*F24H 3/04* (2006.01)
*B60R 19/52* (2006.01)
*F28F 1/10* (2006.01)
*F28F 9/013* (2006.01)
*F28D 1/053* (2006.01)
*F28F 1/12* (2006.01)
*F28D 21/00* (2006.01)

(52) U.S. Cl.
CPC ......... *F24D 19/067* (2013.01); *F24H 3/0452* (2013.01); *F28D 1/05366* (2013.01); *F28F 1/105* (2013.01); *F28F 1/126* (2013.01); *F28F 9/0131* (2013.01); *F28F 9/0135* (2013.01); *B60R 2019/525* (2013.01); *F28D 2021/008* (2013.01); *F28F 2250/06* (2013.01); *F28F 2265/02* (2013.01); *F28F 2275/085* (2013.01); *F28F 2275/12* (2013.01)

(58) Field of Classification Search
CPC .......... F28F 1/105; F28F 1/126; F28F 19/002; F28F 2265/02; F28F 9/0135; F28F 9/0131; F28F 2250/06; B60R 19/52; F28D 1/05366; F28D 2001/028
USPC .......... 165/134.1, 55, 906, 46, 133, 98, 149, 165/DIG. 93, DIG. 95, DIG. 96
See application file for complete search history.

(56) References Cited

U.S. PATENT DOCUMENTS

| | | | | |
|---|---|---|---|---|
| 2,847,192 A | * | 8/1958 | Smith | F28D 7/08 134/169 R |
| 3,938,587 A | * | 2/1976 | Vian | B60K 11/04 165/76 |
| 4,167,212 A | * | 9/1979 | Thekdi | F23L 15/04 122/20 B |
| 4,447,942 A | * | 5/1984 | Jabsen | F22B 37/205 165/172 |
| 4,589,459 A | * | 5/1986 | Lantrip | B60J 11/06 150/166 |
| 4,667,733 A | * | 5/1987 | Bessouat | F16L 55/027 165/134.1 |
| 4,883,139 A | * | 11/1989 | Gross | B60K 11/08 180/68.6 |
| 5,042,575 A | * | 8/1991 | Lindsay | B60H 1/3227 165/133 |
| RE34,907 E | * | 4/1995 | Gross | B60K 11/085 180/68.6 |
| 5,899,287 A | * | 5/1999 | Kadlubski | B60K 11/04 180/68.6 |
| 6,357,513 B1 | * | 3/2002 | Janezich | F28F 1/02 122/510 |
| 6,382,312 B2 | * | 5/2002 | Avequin | F28D 1/0435 165/140 |
| 6,533,027 B2 | * | 3/2003 | Gille | F28D 1/0435 165/140 |
| 2001/0040021 A1 | * | 11/2001 | Avequin | F28D 1/0435 165/67 |
| 2008/0289794 A1 | * | 11/2008 | Leitch | B60K 11/04 165/41 |
| 2011/0232865 A1 | * | 9/2011 | Mildner | B60K 11/085 165/98 |
| 2016/0001629 A1 | * | 1/2016 | Rohr | B60K 11/04 165/76 |
| 2018/0266775 A1 | * | 9/2018 | Farlow | F28F 9/0131 |

FOREIGN PATENT DOCUMENTS

| | | | | |
|---|---|---|---|---|
| DE | 102014110844 A1 | * | 2/2016 | ............ F24D 19/04 |
| EP | 0756074 A1 | * | 1/1997 | ............. F01P 11/12 |
| EP | 2 011 976 A1 | | 1/2009 | |
| EP | 2495521 A1 | * | 9/2012 | ........... F28F 19/002 |
| FR | 2522401 A1 | * | 9/1983 | ......... F28D 1/05333 |
| FR | 3017447 A1 | * | 8/2015 | .......... F24D 19/067 |
| FR | 3035955 A1 | * | 11/2016 | ............ B60R 19/52 |
| FR | 3035956 A1 | * | 11/2016 | ............ B60K 11/04 |
| FR | 3035956 A1 | * | 11/2016 | ............ A60K 11/04 |
| GB | 1380912 A | * | 1/1975 | ............ B60K 11/04 |
| GB | 2040433 A | * | 8/1980 | ........... F28F 9/0135 |
| JP | 58047993 A | * | 3/1983 | ........... F28F 9/0132 |
| JP | 2000052752 A | * | 2/2000 | ........ F28D 1/05366 |
| JP | 3983898 B2 | * | 9/2007 | ........ F28D 1/05366 |
| JP | 2011 162092 A | | 8/2011 | |
| JP | 2011162092 A | * | 8/2011 | |
| JP | 2016133256 A | * | 7/2016 | ............... F28F 9/00 |
| WO | 98/50751 A1 | | 11/1998 | |
| WO | WO 9850751 A1 | * | 11/1998 | ........... F28F 19/002 |
| WO | WO-2018020132 A1 | * | 2/2018 | ............... F28F 9/04 |

OTHER PUBLICATIONS

International Search Report of the International Searching Authority issued in PCT/EP2016/060088 dated Sep. 2, 2016 (2 pages).
Written Opinion of the International Searching Authority issued in PCT/EP2016/060088 dated Sep. 2, 2016 (5 pages).

* cited by examiner

HEAT EXCHANGER COMPRISING A PROTECTIVE DEVICE

The invention relates to the field of protective devices for a heat exchanger and more particularly for a heat exchanger placed at the front end of a motor vehicle.

In the automotive field, heat exchangers placed at the front end can be a victim of flying debris or stones which can damage or even pierce the flat tubes within which a heat-transfer fluid circulates.

In order to protect these heat exchangers, it is known to place a protective device in front of them which can absorb these impacts. Nevertheless, these protective devices are generally fixed by clips which have to be fitted manually, this being a long and tedious process which is not compatible with rapid mass production. The protective device can also be fixed at the periphery of the heat exchanger but this can cause vibration problems under driving conditions owing to the fact that the protective device is not fixed in its central part.

Thus, one of the aims of the invention is to at least partially overcome the disadvantages of the prior art and to propose a protective device with improved fixing.

The present invention therefore relates to a protective device for a heat exchanger, said heat exchanger comprising mutually parallel tubes in which a first fluid circulates, and perpendicular fins connecting two successive tubes, a second fluid circuiting between said tubes by passing through said fins, said protective device being apertured so as to allow the circulation of the second fluid through the fins, said protective device comprising fixing spikes which are inserted forcibly between the fins.

The presence of these fixing spikes makes it possible to fix the protective device against the heat exchanger by simply pressing it against the heat exchanger. The fixing spikes are thus inserted between the fins, deform them, and hold the protective device in place.

According to one aspect of the invention, said tubes are flat tubes.

According to one aspect of the invention, the fixing spikes have a width which is greater than the spacing between two fins.

According to another aspect of the invention, the fixing spikes are integrally formed with the protective device.

According to another aspect of the invention, the protective device comprises longitudinal bars, which are parallel to one another and cover the sides of the flat tubes, and spacers connecting said longitudinal bars, the fixing spikes being arranged on said spacers.

According to another aspect of the invention, the fixing spikes have a length which is less than the width of the fins.

According to another aspect of the invention, the fixing spikes have a length which is greater than or equal to the width of the fins.

According to another aspect of the invention, the protective device additionally comprises elastic-engagement fixings, said elastic-engagement fixings being positioned between two flat tubes in a peripheral portion of the heat exchanger free of fins.

According to another aspect of the invention, the protective device is made of plastic.

The present invention also relates to a heat exchanger comprising a protective device as described above.

According to one aspect of the heat exchanger according to the invention, at least its lower half comprises the protective device.

Other features and advantages of the invention will become more clearly apparent on reading the following description, given by way of illustrative and nonlimiting example, and from the appended drawings, in which.

In the various figures, identical elements bear the same reference numbers.

Figure 1:
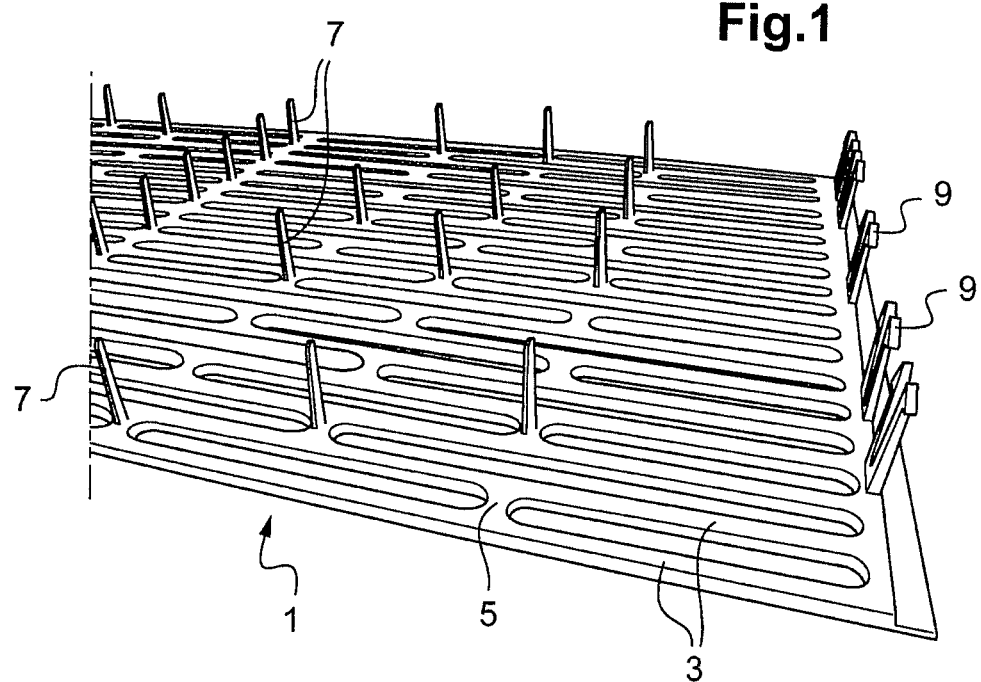
FIG. 1 shows a perspective schematic representation of a protective device.
Figure 2:
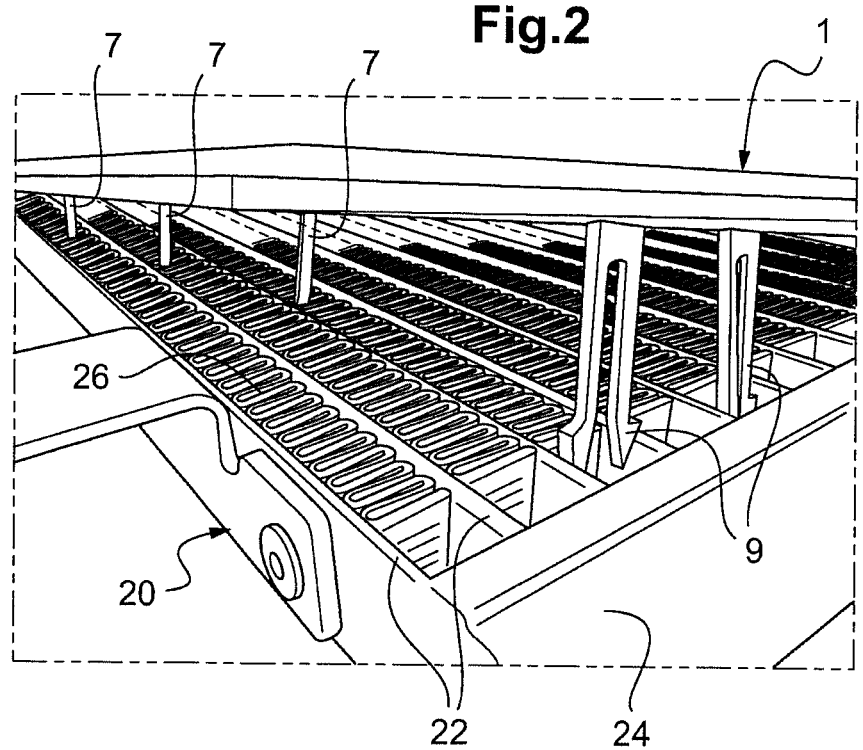
FIG. 2 shows a perspective schematic representation of a protective device during fitting thereof on a heat exchanger.

FIGS. 1 and 2 show a protective device 1 for a heat exchanger 20. The heat exchanger 20 comprises tubes 22, which are in this case mutually parallel flat tubes through which a first fluid circulates between manifolds 24. Between these flat tubes 22 there are arranged fins 26 connecting two successive flat tubes 22. A second fluid circulates between said flat tubes 22 by passing through said fins 26.

The protective device 1 is preferably made of plastic and it is apertured so as to allow the circulation of the second fluid through the fins 26. The protective device 1 also comprises fixing spikes 7 which are inserted forcibly between the fins 26 during fitting of said device, as shown in more detail in FIG. 2.

The presence of these fixing spikes 7 makes it possible to fix the protective device 1 against the heat exchanger 20 by simply pressing it against the exchanger 20. The fixing spikes 7 are thus inserted between the fins 2, deform them, and hold said protective device in place.

The number of the fixing spikes 7 and their distribution is adapted for appropriate fixing of the protective device 1 and also for avoiding any vibration thereof under driving conditions.

Figure 4:
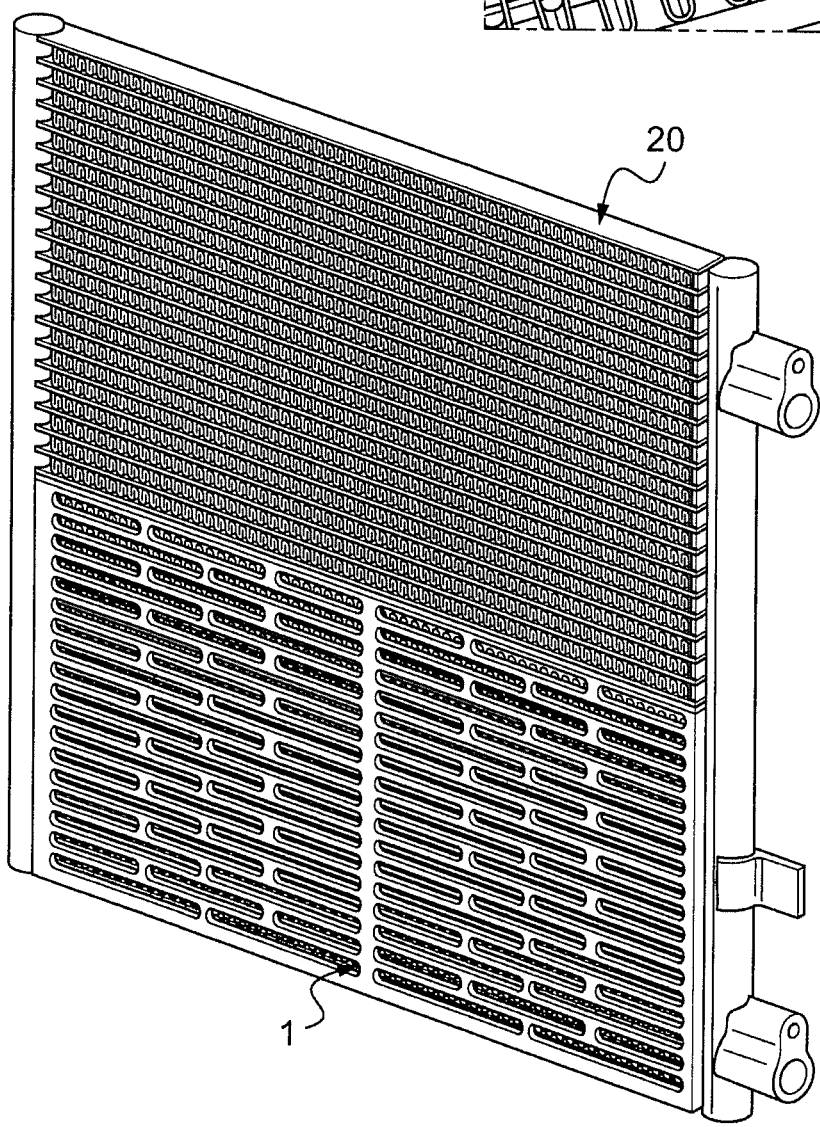
FIG. 4 shows a schematic representation of a heat exchanger with a protective device in a front view.

As shown in FIGS. 1 and 4, the protective device 1 can comprise:
- longitudinal bars 3, which are parallel to one another and intended to cover the sides of the flat tubes 22, and
- spacers 5 connecting said longitudinal bars 3.

The fixing spikes 7 are thus arranged on the spacers 5 so as to be positioned opposite the fins 26.

The protective device 1 can for example cover only the lower half of the heat exchanger 20, which is its portion most exposed to impacts since it is closest to the ground.

Figure 3:
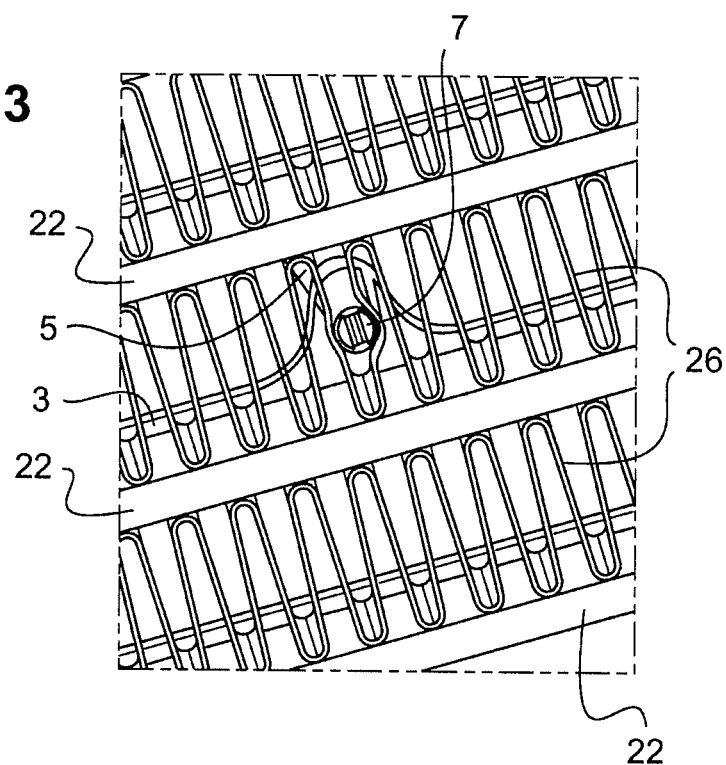
FIG. 3 shows a schematic representation of a heat exchanger in a rear view at the level of the fixing of the protective device.

In order to allow good fixing of the protective device 1, the fixing spikes 7 preferably have a width which is greater than the spacing between two fins 26, as shown in FIG. 3.

The fixing spikes 7 are preferably integrally formed with the fixing device 1 so as to allow straightforward manufacture thereof, for example by molding.

The fixing spikes 7 can have a length which is less than the width of the fins 26 or else a length which is greater than or equal to the width of the fins 26. The determination of the length of the fixing spikes 7 is a function of their number and also of the desired fixing force. The longer the fixing spikes 7, the greater the fixing force.

The protective device 1 can additionally comprise elastic-engagement fixings 9 (clips) which are positioned between two flat tubes 22 in a peripheral portion of the exchanger 20 free of fins 26, as illustrated in FIG. 2. These elastic-engagement fixings 9 reinforce the fixing of the protective device 1 all the more, in particular in the peripheral regions of the heat exchanger 20 where the fins 26 are not present and where vibrations can form.

Thus, it can be clearly seen that the protective device 1, owing to the presence of the multitude of fixing spikes 7, is securely fixed to the heat exchanger 1 and can be installed easily without complex operations.

The invention claimed is:

1. A heat exchanger, for a motor vehicle, comprising:
 a protective device;
 mutually parallel tubes through which a first fluid circulates; and
 perpendicular fins connecting two successive tubes, a second fluid circulating between said tubes by passing through said fins,
 said protective device being apertured into longitudinal bars covering sides of the tubes and separated by parallel slots, wherein each of the parallel slots is divided into a sequence of apertures by spacers connecting said longitudinal bars so as to allow the circulation of the second fluid through the fins,
 wherein said protective device comprises fixing spikes integrally molded on said spacers to have a length of each fixing spike greater than or equal to a width of the fins, said fixing spikes are inserted forcibly between the fins,
 wherein said fixing spikes are disposed away from a periphery of the heat exchanger.

2. The heat exchanger according to claim 1, wherein the fixing spikes have a width which is greater than the spacing between two fins.

3. The heat exchanger as claimed in claim 1, further comprising elastic-engagement fixings, said elastic-engagement fixings being positioned between two tubes in a peripheral portion of the heat exchanger free of fins.

4. The heat exchanger as claimed in claim 1, wherein the heat exchanger is made of plastic.

5. The heat exchanger as claimed in claim 1, wherein the protective device is comprised in a lower half of the heat exchanger.

* * * * *